March 2, 1943.  A. BOYNTON  2,312,315

DIFFERENTIAL STAGE LIFT FLOW DEVICE

Filed Dec. 8, 1939  3 Sheets-Sheet 1

ALEXANDER BOYNTON,
INVENTOR,
BY
ATTORNEYS.

March 2, 1943.  A. BOYNTON  2,312,315
DIFFERENTIAL STAGE LIFT FLOW DEVICE
Filed Dec. 8, 1939  3 Sheets-Sheet 2

ALEXANDER BOYNTON, INVENTOR,
BY Jesse R. Stone
Lester B. Clark
ATTORNEYS.

March 2, 1943.  A. BOYNTON  2,312,315
DIFFERENTIAL STAGE LIFT FLOW DEVICE
Filed Dec. 8, 1939  3 Sheets-Sheet 3

ALEXANDER BOYNTON,
INVENTOR,
BY
ATTORNEYS

Patented Mar. 2, 1943

2,312,315

UNITED STATES PATENT OFFICE 2,312,315

DIFFERENTIAL STAGE LIFT FLOW DEVICE

Alexander Boynton, San Antonio, Tex.

Application December 8, 1939, Serial No. 308,319

15 Claims. (Cl. 137—111)

My invention relates to flow devices for wells, particularly oil wells.

The principal object is to start and flow oil wells at low pressures and low gas-oil ratios.

Another object is to provide mechanism for this purpose which will be operative by the true differential and not be affected by temporary false differentials occurring during the flowing operation.

Another object is to provide a device which can be adjusted to meter the pressure fluid responsive to the liquid load to be lifted by it.

A further object is to control the valve opening movements by a force element and/or by a time element or by a combination of both elements, both of such elements being subject to adjustments adapting them to any well condition.

For such purposes, I employ a differentially operated valve actuated by a piston, one end of which contacts the pressure fluid at its full value and the other end contacts the pressure fluid at a reduced value during the gas intaking operation of the device. A spring is employed to normally urge the pressure fluid control valve to its open position and a latch and/or check valve co-acts with the spring and differential forces to control the valve movements.

The foregoing and other objects are attained by mechanism described in this specification and illustrated in the accompanying drawings, in which—

Similar reference characters are employed to designate similar parts throughout the several views.

Primed sections will be understood as being identical with the unprimed section bearing the same reference numerals, but since some of the parts cut by the primed sections are somewhat different in other places than where so cut, the sections are thus distinguished to avoid possible confusion.

The differential will be understood to be the difference in pressures obtaining in the well within and without the well tubing.

The column of well liquid caused to stand up in the tubing above the depressed liquid level between the tubing and the casing will be referred to as the upstanding column.

Expulsion of liquid from the well will be understood as caused by expansion of pressure fluid admitted into the upstanding column by the flow devices.

The flow devices will be understood as spaced approximately 200 to 300 feet apart in the flow tubing.

The differential force per square inch required to seat the pressure fluid valves ordinarily will be somewhat greater than the force per square inch exerted by a column of unaerated well liquid twice as high as the distance between adjacent devices.

Figures 1, 2, 3, 4, 5, 6, 7, 8:
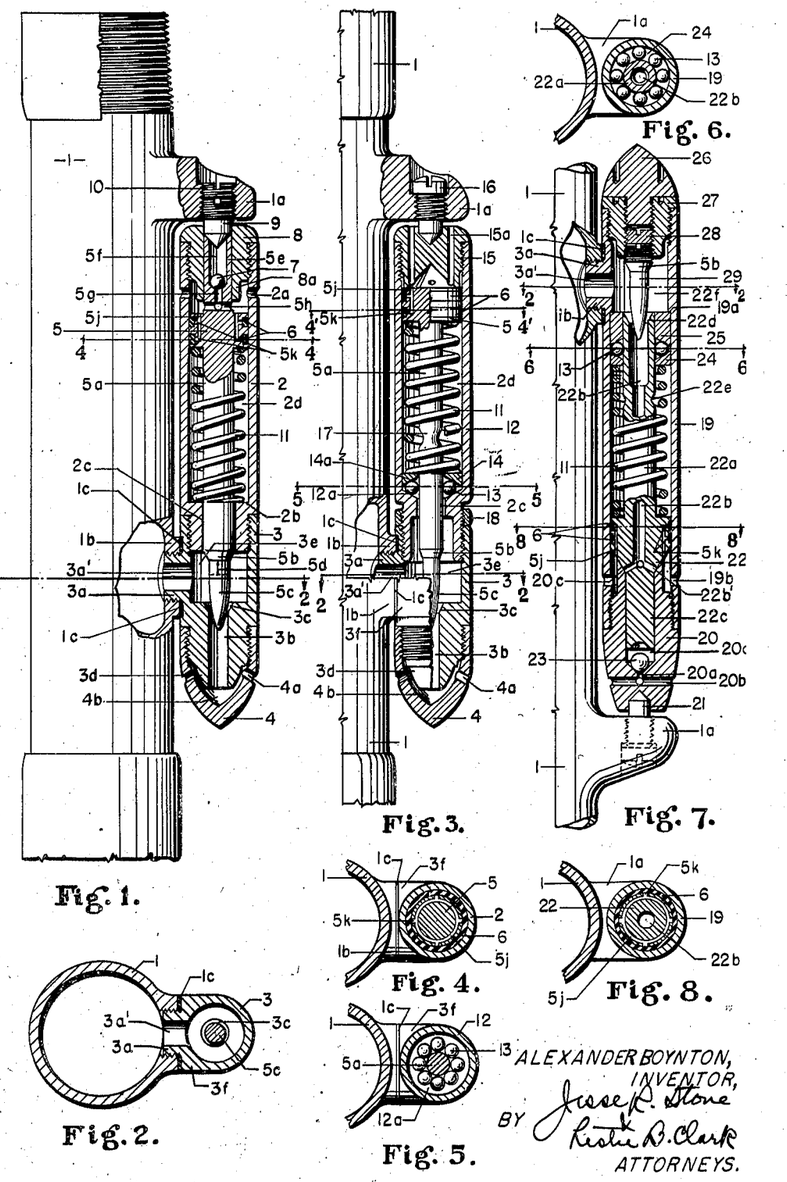
Fig. 1 is mainly a longitudinal section through the preferred embodiment, part of which is in outside view.
Fig. 2 is a cross section on the line 2—2, Fig. 1.
Fig. 3 is mainly a longitudinal section through a modified form of the invention.
Fig. 4 is a cross section on the line 4—4, Fig. 1.
Fig. 5 is a cross section on the line 5—5, Fig. 3.
Fig. 6 is a cross section on the line 6—6, Fig. 7.
Fig. 7 is mainly a longitudinal section through another modified form of the invention.
Fig. 8 is a cross section on the line 8—8, Fig. 7.

The tubing nipple 1, having the guide projection 1a has the boss 1b into which the boss 3a extending outward from the larger boss 3f (see Fig. 2) of the anchoring nipple 3, has threaded connection, the washer 1c being interposed for the purpose of making the connection hermetic. The intake cap 4, threadedly joined upon the lower end of the nipple 3, has the inclined intake openings 4a adapted to discharge pressure fluid against the baffle 3d which extends into the chamber 4b and communicates with the central opening 3b, having its upper end formed into the valve seat 3c.

The tubular shell 2 has threaded connection within the nipple 3 and similar connection over the bushing 8. The stud 9, having threaded engagement within the projection 1a, has its lower end closely engaged within the upper end of the bushing 8 for the purpose of securing the shell 2 in alignment with the tubing nipple 1. The lock screw 10 secures the proper depth of engagement of the stud 9 within the bushing 8.

The piston 5 is closely slidable within the smooth bore of the shell 2, this fit being made hermetic by the packing rings 6 adapted to be expanded against the shell 2 by pressure fluid contacting their inner sides through the annular recess 5j and the openings 5k. This piston has a downward extension 5a having its lower extremity formed into the metering pin 5c and the valve 5b, this valve being adapted to engage the valve seat 3c. The lower portion of the metering pin is convexly tapered and its upper untapered portion 5d has a close slide valve fit within the opening 3b.

The coiled spring 11, having slight clearance within the shell 2, may be installed under some compression and has its lower end engaged upon the internal annular shoulder 2b with its upper end engaged under the piston 5. This spring resiliently urges the tubular extension 5e of the member 5 to engage the stud 9 thereby positioning the lower portion of the metering pin 5c within the opening 3b. The depth of this engagement determines the volume of the initial flow of pressure fluid through the device at low differentials, and may be adjusted by screwing the stud upward or downward, as is obvious.

The check valve 7 has slight clearance within the chamber 5f and seats over the small opening 5g communicating between the chamber 5f and the cross bores 5h. The tubular extension 5e of the member 5 has slight clearance, such as two or three thousandths of an inch, within the bushing 8. The downward tubular extension 8a of the bushing 8 serves as a guide for the extension 5e and also serves as a baffle, if, after long use, the piston 5 should develop leaking clearance within the shell 2, thereby permitting some gas to pass by it.

In the operation of the construction as just described, the pressure fluid entering the tubing via the small metering openings 4a will have its pressure reduced within the chamber 4b because of the means of free escape into the tubing through the larger opening 3b, the chamber 3e, and the opening 3a'. The relatively low pressure thus brought about within the chamber 3e communicates to the nether end of the piston 5 via the clearance 2c and the chamber 2d, while the full force of the pressure fluid contacts the upper end of the piston through the lateral openings 2a. In this manner the valve 5b is urged toward its seat 3c by relatively high differentials during the well flowing operation.

Obviously, pressure fluid entering through the openings 4a will build up force under the metering pin 5c immediately after the untapered portion 5d of the pin enters the opening 3b, but at such times the differential is high, resulting from relatively low pressure within the tubing. This low pressure acts under the piston and is overcome by the high pressure above the piston to seat the valve 5b.

The convexly tapered pin 5c will meter a constantly diminishing volume of pressure fluid as its clearance diminishes within the opening 3b. The untapered portion 5d of the pin closely received within this opening, will not permit any pressure fluid to pass until this untapered portion is withdrawn; but such withdrawal is sometimes sudden, caused by the back pressure of falling slugs of well liquid within the tubing and by other pressure disturbances therein.

In order to prevent the valve 5b from becoming suddenly driven too far from its seat by false differentials, the check valve 7 is provided. While the valve 5b is traveling toward its seat 3c, pressure fluid entering through the openings 5h and 5g unseats the valve 7 and fills the chamber 5f and the space left open under the stud 9 by the downward movement of the tubular extension 5e. Pressure fluid, therefore, is trapped above the check valve 7 when the valve 5b is seated and the latter valve cannot recede, except as the pressure fluid so entrapped escapes through the slight clearance between the tubular extension 5e and the bushing 8, it being assumed that the stud 9 has almost hermetic engagement within this bushing. Manifestly, the small clearance between the bushing 8 and the stud 9 can be made such that the opening of the valve 5b can be timed so that the duration of temporary false differentials will be less than the time required to open the valve.

In Fig. 3 is shown a modified form of the invention in which a latch is employed replacing the check valve 7 in Fig. 1. The latch is adjustable to hold the valve 5b releasably seated by a pre-determined force. The straight portion 5d of the metering pin 5c in Fig. 1 is omitted in Fig. 3 because the latch employs a force element instead of a time element in resisting the opening of the valve 5b.

In this, and subsequent modifications of the invention, it will be understood that parts bearing the same reference characters are identical in purpose as well as in form. The function of such parts, therefore, will not necessarily be repeated.

The shell 12 has its lower internal restriction formed into an inclined ball floor surface 12a. The ball roof 14 slidable within the shell 12, has a lower inclined surface 14a. These inclined surfaces are adapted to urge the latch balls 13 against the depending extension 5a of the piston 5 by the expansive force of the spring 11. The latch balls will engage within the restriction 17 of the extension 5a when the valve 5b is seated. This valve, therefore, will be releasably engaged upon the seat 3c by the force of the latch which may be adjusted for any depth of engagement of the balls 13 within the restriction 17 by means of screwing the shell 12 upwardly or downwardly within the member 3. Such engagement may be secured by the lock ring 18 threadedly engaged over the member 12.

The bushing 15, shown threadedly engaged within the upper end of the shell 12, is adapted to have a countersink in its upper end engaged by the cap screw 16, threadedly engaged within the projection 1a, for the purpose of securing the shell 12 in alignment with the tubing nipple 1, as appears in Fig. 3. The spring 11 urges the piston 5 normally to contact the lower end of the bushing 15. The openings 15a provide that pressure fluid may contact at all times the piston 5 and actuate it, as was explained in connection with Fig. 1.

In Fig. 7, illustrating a further modified form of the invention, the check valve 23 similar to the check valve 7 in Fig. 1, is combined with a latch, as in Fig. 3, for the purpose of employing both the time element of the check valve and the force element of the latch to control the opening movement of the valve 22d.

The shell 19, having the boss 3a threadedly connected into the boss 1b of the tubing nipple 1, as in Figs. 1 and 3, has threaded connection with the lower end cap 20, having a countersink in its lower extremity into which the cap screw 21 is engaged by means of its threaded connection through the projection 1a of the tubing nipple 1, this nipple having ends reversed from its position in Figs. 1 and 3.

The top end bushing 27, having its upper end closed by the cap 26, has threaded connection within the upper end of the shell 19. The metering pin 29 has threaded connection within the bushing 27, where it may be secured by the lock screw 28. The untapered portion 5d, as in Fig. 1, is omitted from the metering pins in Figs. 3 and 7, because each of these figures shows a latch employed to forcibly delay the opening of the pressure fluid valve.

The piston 22 and the rings 6 serve the same purpose as the piston 5 in the preceding embodiments. This piston 22 has an upstanding tubular extension 22a, having the longitudinal opening 22b and the communicating inclined cross bores 22b', the upper end of this member being formed into the valve 22d adapted to engage the seat 5b. The convexly tapered metering pin 29 has its lower end normally positioned somewhat within the opening 22b and may be moved upward or downward by means of its threaded engagement within the bushing 27.

The ball roof 25, which may be pressed into the shell 19 and landed upon the internal annular shoulder 19a, has its lower extremity formed into an inclined surface co-acting with a similar inclined surface upon the upper side of the ball floor 24 always resiliently to urge the latch balls 13 against the extension 22a by the force of the coiled spring 11. The ball floor 24 is closely slidable within the shell 19. These balls engage within the latching recess 22e when the valve 22d is engaged upon its seat 5b. The depth that the latch balls engage within the recess 22e manifestly determines the force of the latch engagement. The pin 29 may be screwed upwardly or downwardly to adjust the latch, as is apparent in Fig. 7.

Pressure fluid enters the well tubing through the device via the lateral openings 19b, the cross bores 22b', the longitudinal opening 22b, the chamber 22f, and the lateral opening 3a'. It will be observed that the upper end of the member 20 is formed into a valve seat 20c normally engaging a valve formed upon the lower end of the piston 22. This valve closes over the cross bores 22b' during the absence of appreciable differential and acts as a check valve to prevent back flow of well liquid through the devices at conclusion of the flowing operation. When sufficient differential develops to start the piston 22 upward, the cross bores 22b' will open instantly, as is apparent.

When the piston 22 rises, pressure fluid enters the cross bores 20b and passes through the opening 20a, lifts the check valve 23, and fills the chamber 20d vacated by the depending extension 22c.

When the valve 22d is seated, the latch is engaged and the chamber 20d then elongated below the extension 22c is filled with pressure fluid. At a pre-determined less differential than that required to seat the valve 22d, that valve will open by the releasing of the latch, but it will open slowly, because the pressure fluid in the chamber 20d is trapped by the check valve 23 and cannot escape, except through the slight clearance around the extension 22c. This clearance may be made so slight that the valve 22d will open very slowly to prevent momentary false differentials from causing improper admission of pressure fluid into the upstanding liquid column within the well tubing.

It will be observed in Fig. 7 that the extension forming the valve seat 20c above the cross bores 22b' acts as a baffle to prevent the lower portion of the piston 22 and the extension 22c from being abraded by foreign substances, such as sand in the pressure fluid.

Figure 9:
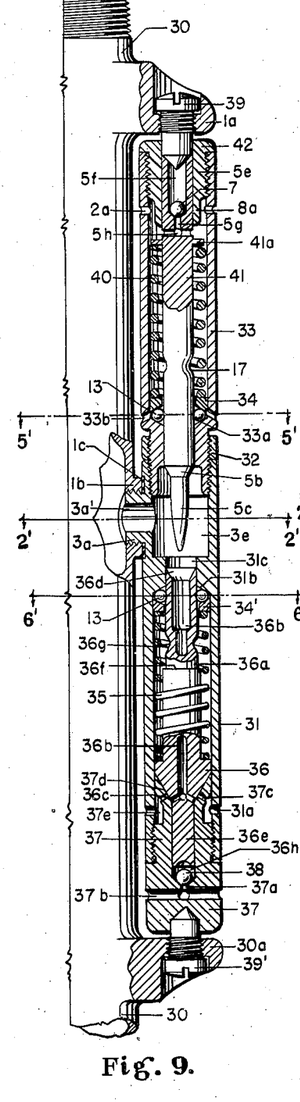
Fig. 9 is mainly a longitudinal section through another modified form of the invention.

In Fig. 9, the tubing nipple 30, having the projections 1a and 30a, has its boss 1b threadedly joined over the boss 3a of the anchoring nipple 31, the interposed washer 1c serving to make the connection hermetic. The nipple 31 has its lower end threadedly engaged over the lower plug 37, this plug having a countersink into which the lower cap screw 39' is engaged by means of its threaded connection through the projection 30a in order to secure alignment of the nipples 30 and 31.

The upper nipple 33 has threaded engagement with the nipple 31 and has its upper end similarly engaged with the cap 42, having a central opening in its upper end engaged over the upper cap screw 39 threadedly connected through the extension 1a for the purpose of securing the nipples 33 and 30 in alignment.

The upper plunger 41, closely slidable through the lower constriction of the nipple 33, has an annular flange 41a which has relatively large clearance within the nipple 33 and has its lower end formed into the valve 5b and the convexly tapered metering pin 5c.

This plunger member has a constriction 17, as in Fig. 3, for engaging the latch and an upper tubular extension 5e, having the chamber 5f within which the check valve 7 is adapted to seat over the opening 5g, which communicates with the cross bores 5h, as in Fig. 1. The extension 5e has very slight clearance within the cap 42.

The nipple 33, proximate its lower end, has a constriction through which the plunger 41 is freely slidable. The upper end of this constriction is formed into an inclined surface 33a upon which the latch balls 13 are engaged by the lower inclined surface of the ball rider 34, freely slidable over the plunger 41 and within the nipple 33. The coiled spring 40, having slight clearance within the nipple 33, and larger clearance over the plunger 41, may be installed under some compression between the flange 41a and the ball rider 34. This spring urges the latch balls constantly to contact the plunger 41 and to engage within the restriction 17 when the valve 5b is engaged with its seat 36d upon the upper end of the intake plunger extension 36a. The spring 40 also causes the tubular extension 5e of the plunger 41 normally to have yieldable engagement with the lower extremity of the cap screw 39.

The intake plunger 36 has its upstanding tubular extension 36a slidable through the opening 31c and has a depending extension 36e having slight clearance within the plug 37. The plunger 36 has an external recess 36g within which the latch balls 13 are adapted to engage when the external annular shoulder 36f is engaged upon the ball rider 34' slidable over the extension 36a of the intake plunger 36 and within the shell 31 as appears in Fig. 11. The latch balls 13 are constantly urged inwardly to contact the extension 36a by the upper inclined surface of the ball rider 34', slidable within the shell 31 and over the extension 36a, co-acting with the inclined surface 31b upon the nether side of a constriction within the nipple 31.

The upper end of the longitudinal opening 36b through the plunger 36 is expanded to closely receive the upper end of the metering pin 5c. The cross bores 36c communicate with the opening 36b immediately below the most expanded portion of the plunger 36 which portion is formed into a valve adapted to be normally resiliently engaged upon the valve seat 37d formed upon the upper end of the plug 37. By this engagement of the members 36 and 37, the intake passages 37c are closed in order to provide a check valve which will prevent the well tubing from draining through the flow devices at conclusion of the flowing period.

In operation of the modified construction just described, upon the development of slight differential, the intake plunger 36 will rise and permit pressure fluid to enter the well tubing via the intake openings 31a, the annular chamber 37e, the intake passages 37c, the intake passages 36c, the opening 36b, the chamber 3e, and the opening 3a'. The lower spring 35, being somewhat weaker than the upper spring 40, the intake plunger 36 will rise and close its annular shoulder 36f upon the ball rider 34' while the latch balls 13, at the same time, will engage within the recess 36g, as in Fig. 11.

After the intake plunger 36 rises from seat 37d and until it approaches latching position, as just described, the flow of pressure fluid through the device is unrestricted. As it approaches latching position, however, its upper end telescopes over the lower end of the metering pin 5c with which it then has relatively large clearance. Pressure fluid entering through the openings 2a now exerts increasing pressure upon the upper plunger 41, as the differential increases. The metering pin 5c is forced thereby into deeper engagement and constantly diminishing clearance within the opening 36b of the intake plunger 36 until the valve 5b finally engages upon the seat 36d, thereby cutting off the flow of pressure fluid through the device at a pre-determined differential. The openings 33b are to drain the nipple 33 and keep the upper latch clean.

The chamber 37e and the expanded upper end of the member 37 provide that the inflow of pressure fluid is baffled so that it will not abrade the plunger 36. The openings 37c should be aggregately larger than the intake openings 31a in order that the rate of flow through the openings 37c will be comparatively slow so that the plunger 36 and its lower extension 36e will not be abraded by foreign substances in the pressure fluid.

The true differential is often disturbed by falling slugs of well liquid within the eduction tube, resulting in frequent momentary false differentials which often cause the valves controlling the flow of pressure fluid through flow devices to fly open when they should remain closed.

To overcome the valve opening force of false differentials, I provide a latch and a check valve for each plunger. The upper latch may be adjusted by screwing the upper nipple 33 upward or downward within the anchoring nipple 31, the desired adjustment being secured by the lock ring 32. The lower latch may be regulated by varying the force of the spring 35 or by lengthening or shortening the ball rider 34'.

Figure 11:
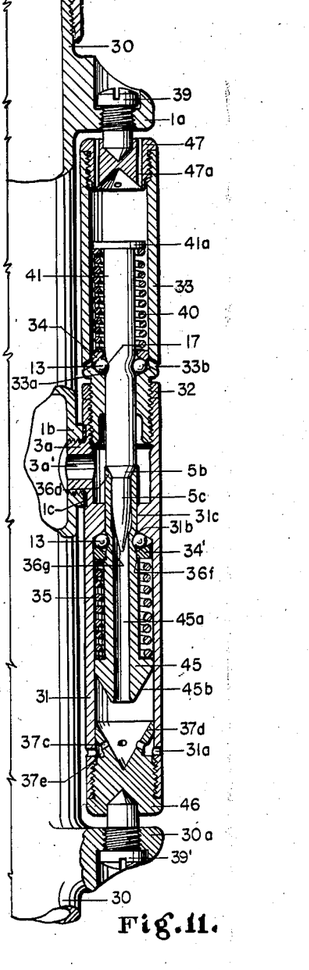
Fig. 11 is mainly a longitudinal section through another modification of the invention.

When the upper and lower plungers are fully engaged, as illustrated in Fig. 11, the chamber 5f in Fig. 9 (then lengthened by the distance of the upper plunger travel) will be full of pressure fluid entrapped by the check valve 7 and the other chamber 36h above the check valve 38, then vacated by the lower plunger extension 36e, likewise will be full of pressure fluid, which entered through the cross bores 37b and the central opening 37a and lifted the check valve 38. This entrapped pressure fluid cannot escape from the chamber 5f except through the slight clearance around the tubular extension 5e. Neither can the pressure fluid escape from beneath the extension 36e except through the slight clearance around it. Therefore, it is apparent that both plungers will be retarded in their valve opening movements, firstly, by the force necessary to spring their respective latches and secondly, by the slowly yielding resistance of the pressure fluid entrapped by the check valves 7 and 38 until this fluid is gradually forced out. Such resistance to the temporary force of false differentials will cause the valves controlling the flow of pressure fluid through the devices to respond only to true differentials.

Figure 10:
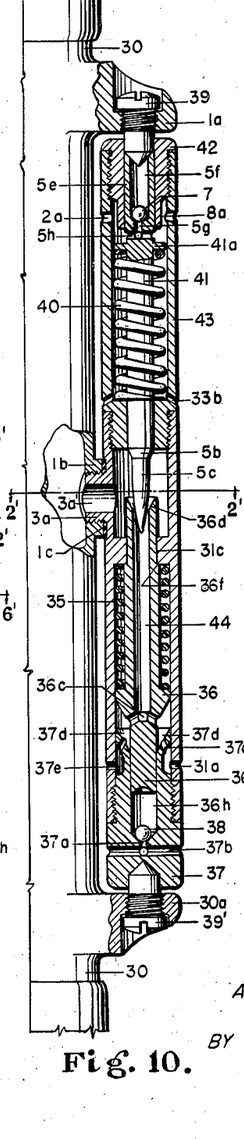
Fig. 10 is mainly a longtiudinal section through a further modified form of the invention.

In Fig. 10, illustrating a further modification of the invention, I omit both latches employed in Fig. 9 and use only the two check valves, the operation of the device being otherwise the same as in Fig. 9.

The upper nipple 43 serves the same purpose as the nipple 33 in Fig. 9, except that it does not have the ball floor 33a for a latch and does not have the lock ring 32 threadedly engaged over it, both of these features being unnecessary since the latch is omitted. The longitudinal opening 44 is also similar in purpose to the similar but somewhat different opening 36b in Fig. 9.

In Fig. 10, the intake plunger 36 is shown in its extreme upper position which illustrates the position which this member will assume in Fig. 9 at a comparatively slight differential before the metering pin 5c begins to move downwardly.

Otherwise than stated, the operation of the devices illustrated in Figs. 9 and 10 are so similar as to be easily understood without further explanation.

In Fig. 11 is shown a further modification in which I employ two latches identical with the latches shown in Fig. 9, but the two check valves in Figs. 9 and 10 are omitted. Fig. 11 also shows the closed position of both plungers, while in Fig. 9 both plungers are in their normal remote positions and in Fig. 10 only the intake plunger is moved to its upper position with the upper plunger still unmoved from its normal uppermost position.

The intake plunger 45 has a central longitudinal opening 45a serving the same purpose as the similar, but somewhat different, openings 36b in Figs. 9 and 44 in Fig. 10. The valve 45b normally engages the seat 37d in Fig. 11 and acts as a check valve closing the openings 37c to prevent drainage of well liquid through the devices after conclusion of the flowing operation.

The lower plug 46, threadedly engaged within the nipple 31, has a counter sink into which the cap screw 39' is engaged for the purpose of aligning the nipple 31 with the tubing nipple 30. Likewise, the upper cap 47, having threaded engagement within the nipple 33, has a countersink into which the cap screw 39 is engaged for the purpose of securing alignment of the nipples 33 and 30.

The openings 47a, corresponding to the openings 2a in Figs. 9 and 10, serve to admit pressure fluid to act upon the plunger 41, as has been explained.

The operation of the device illustrated in Fig.

11 will be like the device in Fig. 9, except that both plungers 33 and 45 will move suddenly after their respective latches are sprung by pre-determined differentials.

Figure 14:
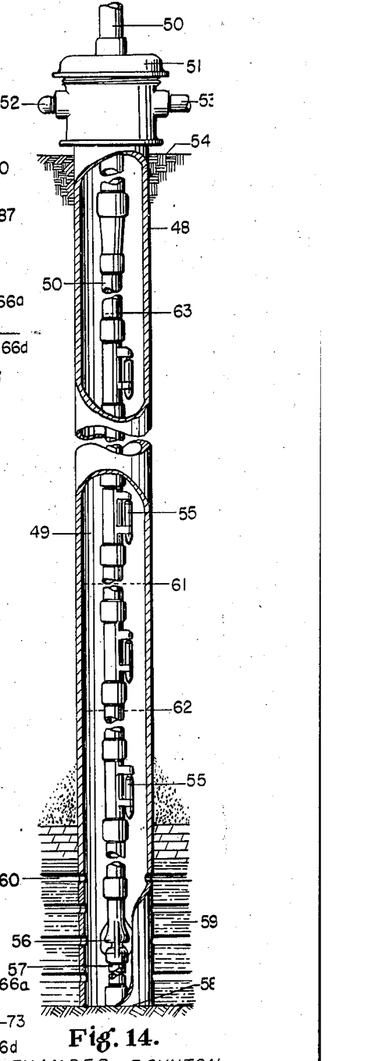
Fig. 14 is an installation plan of the flow devices in a well, the casing being shown mainly in vertical section, the tubing, flow devices, and casing head being in outside view.

Either embodiment of the devices herein shown now will be assumed to be installed in a well, as illustrated in Fig. 14.

The tubing 50, centrally positioned within the casing 48, has the flow devices 55 connected into it at intervals varying from 200 to 300 feet, as well conditions may require. The casing head 51 is employed to effect a hermetic closure between the tubing 50 and the casing 48 proximately above the ground surface 54. One side of the casing head may be closed by a bull plug 52 and the other side may be connected with a pressure fluid supply line 53.

The anchor string 57 may extend from the intake nipple 56 to the bottom of the well 58. Production from the formation 59 enters the well casing through the gun perforations 60.

If the well produces enough gas to flow it, the line 53 will be closed, but if the well does not produce enough gas for that purpose, pressure fluid will be supplied into the annular space 49 via the pipe line 53.

The well liquid is assumed to be standing at 61 in both the casing and the tubing. The tubing 50, extending above the casing head, is open and may be connected with a flow tank.

Pressure fluid from the line 53 is now turned into the well. The differential necessary to close the devices will quickly establish, while the liquid within the annular space 49 will be depressed to 62 and, at the same time, will rise in the tubing to the level indicated at 63. The upstanding column of liquid extending from 62 to 63 is then in balance against the pressure fluid force. The base of this column, or the level at 62, is the place of no differential at that time, but the differential increases from there upward as the weight of the upstanding column decreases at higher levels.

The device next above the depressed liquid at 62 will be open and intaking pressure fluid, while the device proximately above it will be partially open or just closed according to the differential there.

As the depressed liquid level in the annular space 49 is gradually lowered by outflow from the well, each succeeding device will be uncovered in the intaking position, due to the slight differential obtaining there at such time on account of outflow from the tubing.

A surface intermitter may be employed to open the tubing automatically at a pre-determined value of the pressure fluid within the annular space 49 and to close the tubing when the pressure fluid there becomes depleted to a pre-determined value.

Figure 12:
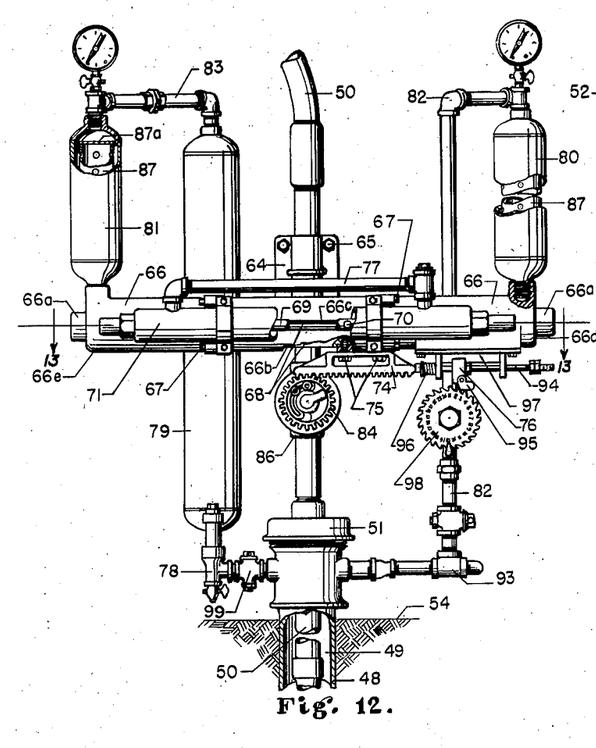
Fig. 12 is mainly an outside view of a surface intermitter installed in a well equipped with the flow devices herein illustrated and described.
Figure 13:
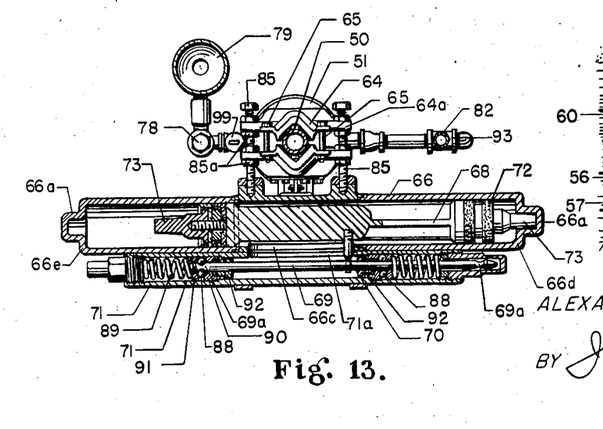
Fig. 13 is a cross section on the line 13—13, Fig. 12.

If compressed air or gas be employed to flow the well at the greatest pressure at which the well will produce its allowable, the best gas-oil ratios will result. If, to illustrate, a well will produce the allowable at 200 pounds working pressure, a surface intermitter which will open the tubing 50 at 210 pounds and close it at 190 pounds in the annular space 49 will produce this result. Such an intermitter is illustrated in Figs. 12 and 13.

The clamps 64 are secured upon the well tubing 50 by the bolts 65. The bolts 85, engaged within the cylinder 66, are also engaged through the extensions 64a of the clamps 64 Fig. 13. These bolts provide that the position of the cylinder may be adjusted by means of the nuts 85a, so that the rack 74 will properly engage the pinion 84 which operates the valve 86, this rack being secured to the piston 68 by the rack cap screws 75 slidable in the slot 66b of the cylinder 66. The cylinder 66 may be made in three parts secured together by the bolts 67.

The piston 68, having the cups 72 secured to its ends by means of the dashpot plungers 73, is slidable within the cylinder 66 and is actuated by the force of pressure fluid exerted upon its ends.

The tubular conduit 82 has a connection with the casing head 51 and transmits pressure fluid force from the annular space 49 into the high pressure end of the cylinder 66 via the tubular reservoir 80 having threaded connection between the cylinder and the conduit 82.

The pressure regulator 78, the reservoir 79, the conduit 83, and the reservoir 81 provide tubular connection between the casing head 51 and the low pressure end 66e of the cylinder 66.

Each of the reservoirs 80 and 81 may be filled with a lubricant which will follow the piston and lubricate it and the cylinder, the baffle tube 87, having a top plate 87a, being to prevent the lubricant from being driven by the piston into the conduits 82 and 83.

At either end of the piston travel, the dashpot plungers 73 engage within the dashpot pockets 66a for the purpose of cushioning the impact of the piston.

The latch shaft 69 has recesses 69a proximate its ends into which the latch balls 88 engage by the force of the springs 89, co-acting with the confronting inclined surfaces of the ball bases 90 and the ball riders 91. The pin 70, slidable in the slots 71e of the latch housing 71 and the slot 66c of the cylinder 66 has one end extended through the latch shaft 69 and has its other end threadedly engaged within the side of the piston 68. This pin actuates the latch which engages at either end of the piston travel. The pipe 77, connected with either end of the latch housing 71, provides that a lubricant confined in either end of the latch by means of the gland 92, may circulate to avoid impinging the latch.

In operation, it will be assumed that the well is to be flowed by pressure fluid having an average force of 200 pounds per square inch. The pressure regulator will be set to close at 200 pounds. The check valve 99 will trap 200 pounds of pressure fluid in the reservoir 79, which fluid contacts the low pressure end 66e of the piston. Pressure will continue to build up in the annular space 49 (whether supplied by the well or from an external source through a line which may be connected into the T 93). The latches will be assumed to hold against ten pounds per square inch exerted upon the piston ends. When the pressure in the annular space 49 increases to 210 pounds, the latch will spring and the piston will travel from the high pressure end 66d to the low pressure end 66e of the cylinder. During the flowing operation, the pressure fluid force within the annular space 49 will gradually decrease, the pressure fluid supply being so regulated. When this force decreases to 190 pounds, the 200 pounds trapped in the reservoir 79 by the check valve 99 acts upon the low pressure end 66e of the piston to drive it back to the other end and close the tubing valve 86. Pressure fluid again builds up within the annular space 49 and the cycle automatically repeats.

The mechanical counter indicated generally at 70 is actuated by the rack 74 upon each return of the piston to the high pressure end of the cylinder, this being the valve closing movement. The rod 94, slidable through both flanges of the bracket 97, is resiliently urged toward the rack by the spring 96 normally positioning the swinging pawl 95 somewhat to the left of the position shown in Fig. 12. This pawl rides freely over the ratchet wheel 98 during the piston travel toward the low pressure end of the cylinder, but turns the ratchet wheel slightly on its reverse travel to advance the count by one each time.

It will be understood that many minor changes in construction and substitution of other parts for those shown can be made within the scope and purpose of the stated objects and appended claims.

What is claimed is:

1. A well flowing device of the character described including a tubular valve body having a valved passageway in the wall thereof including an inlet and an outlet for admission of pressure fluid from the exterior to the interior of the body, a chamber in alignment with the passageway, a piston slidable in said chamber, a valve carried by the piston, means normally urging said valve to open position, there being openings in the chamber to admit pressure fluid tending to overcome said last mentioned means, and means for admitting pressure fluid to the passageway at a reduced pressure, said valve and passageway being cooperatively contoured whereby pressure fluid is automatically metered to the interior of the valve body.

2. A well flowing device of the character described including a valve body having a valved passageway including an inlet and an outlet for admission of a pressure fluid from the exterior to the interior of the body, a chamber in alignment with the passageway, a piston slidable in said chamber, a valve seat in the passageway, a valve carried by the piston, means normally urging the valve to open position, there being openings in said chamber to admit pressure fluid tending to move the piston and valve to closed position, and means for restricting the rate of movement of the piston and valve toward open position so that the opening movement of the valve in response to changes in differential pressure will be retarded.

3. A well flowing device of the character described including a valve body having a valved passageway including an inlet and an outlet for admission of a pressure fluid from the exterior to the interior of the body, a chamber in alignment with the passageway, a piston slidable in said chamber, a valve seat in the passageway, a valve carried by the piston, means normally urging the valve to open position, there being openings in said chamber to admit pressure fluid tending to move the piston and valve to closed position, means for restricting the rate of movement of the piston and valve toward open position so that the opening movement of the valves in response to changes in differential pressure will be retarded, said last mentioned means comprising a plunger extending axially of the piston and loosely fitting within a bore in the end of the chamber, and a check valve for admitting fluid to the interior of the bore during closure of the valve.

4. A well flowing device of the character described including a valve body having a valved passageway including an inlet and an outlet for admission of a pressure fluid from the exterior to the interior of the body, a chamber in alignment with the passageway, a piston slidable in said chamber, a valve seat in the passageway, a valve carried by the piston, means normally urging the valve to open position, there being openings in said chamber to admit pressure fluid tending to move the piston and valve to closed position, and means releasably latching the valve in closed position so that the valve will be opened by said first mentioned means only after a predetermined less pressure differential obtains.

5. A well flowing device of the character described including a valve body having a valved passageway including an inlet and an outlet for admission of a pressure fluid from the exterior to the interior of the body, a chamber in alignment with the passageway, a piston slidable in said chamber, a valve seat in the passageway, a valve carried by the piston, means normally urging the valve to open position, there being openings in said chamber to admit pressure fluid tending to move the piston and valve to closed position, means releasably latching the valve in closed position so that the valve will be opened by said first mentioned means only after a predetermined less pressure differential has been developed, said last mentioned means comprising an annular groove in the valve adjacent the seating surface thereon, and latch balls within the chamber and urged into latching engagement with said groove by said first mentioned means.

6. A well flowing device of the character described including a valve body having a valved passageway including an inlet and an outlet for admission of a pressure fluid from the exterior to the interior of the body, a chamber in alignment with the passageway, a piston slidable in said chamber, a valve seat in the passageway, a valve carried by the piston and adapted to enter said valve seat, means normally urging the valve to open position, there being openings in said chamber to admit pressure fluid tending to move the piston and valve to closed position, means operable by a velocity head in the pressure fluid for admitting such fluid to the passageway at a reduced pressure, said valve and passageway being cooperatively contoured to automatically meter as the valve assumes positions intermediate the open and closed positions, and means for restricting the rate of movement of the piston and valve toward open position.

7. A well flowing device of the character described comprising a valve body, a housing associated therewith, a transverse wall in said housing forming aligned chambers, there being an opening in said wall between the chambers, a passage from one of the chambers to the interior of the valve body, a tubular piston slidable in the other of said chambers, a tubular stem on said piston extending into said opening, a seating surface on said piston, a complementary seating surface in said other chamber adapted to be engaged by the piston, means normally urging said seating surfaces into engagement, said piston having a passage from the internal bore to the seating surface thereon and said housing having a passage from the exterior to the seating surface therein but out of alignment with the first mentioned passage when the seating surfaces are engaged, and a valve seat in said first mentioned chamber adapted to cooperate with the tubular stem to automatically meter the passage of pressure fluid to the interior of the valve body.

8. A well flowing device of the character described comprising a valve body, a housing associated therewith, a transverse wall in said housing forming aligned chambers, there being an opening in said wall between the chambers, a passage from one of the chambers to the interior of the valve body, a tubular piston slidable in the other of said chambers, a tubular stem on said piston extending into said opening, a seating surface on said piston, a complementary seating surface in said other chamber adapted to be engaged by the piston, means normally urging said seating surfaces into engagement, said piston having a passage from the internal bore to the seating surface thereon and said housing having a passage from the exterior to the seating surface therein but out of alignment with the first mentioned passage when the seating surfaces are engaged, a valve seat in said first mentioned chamber adapted to cooperate with the tubular stem to automatically meter the passage of pressure fluid to the interior of the valve body, and means for retarding the rate of movement of the piston toward engagement of the seating surfaces.

9. A well flowing device of the character described comprising a valve body, a housing associated therewith, a transverse wall in said housing forming aligned chambers, there being an opening in said wall between the chambers, a passage from one of the chambers to the interior of the valve body, a tubular piston slidable in the other of said chambers, a tubular stem on said piston extending into said opening, a seating surface on said piston a complementary seating surface in said other chamber adapted to be engaged by the piston, means normally urging said seating surfaces into engagement, said piston having a passage from the internal bore to the seating surface thereon and said housing having a passage from the exterior to the seating surface therein but out of alignment with the first mentioned passage when the seating surfaces are engaged, a valve seat in said first mentioned chamber adapted to cooperate with the tubular stem to automatically meter the passage of pressure fluid to the interior of the valve body, means for retarding the rate of movement of the piston toward engagement of the seating surfaces, said last mentioned means comprising a plunger extending axially of the piston and loosely fitting within a bore in the end of said other chamber, and a check valve for admitting fluid to the interior of the bore as the stem moves toward engagement with the valve seat.

10. A well flowing device comprising a valve body, a housing attached to said body and having an opening in its lower end for communication to the interior of the valve body, a tubular piston slidable in the lower end of said housing, and adapted to conduct pressure fluid from the lower end of the housing to an opening in the valve body, a valve seat member slidably mounted in the housing in opposed alignment with the tubular piston, said valve seat member including a metering pin adapted to enter the bore of the tubular piston and meter the flow of pressure fluid to the interior of the valve body, means resiliently urging the tubular piston and the valve seat member toward retracted positions, and means for retarding the rate of movement of the piston, and valve seat members to retracted positions.

11. A well flowing device comprising a valve body, a housing attached to said body and having an opening in its lower end for communication to the interior of the valve body, a tubular piston slidable in the lower end of said housing, and adapted to conduct pressure fluid from the lower end of the housing to an opening in the valve body, a valve seat member slidably mounted in the housing in opposed alignment with the tubular piston, said valve seat member including a metering pin adapted to enter the bore of the tubular piston and meter the flow of pressure fluid to the interior of the valve body, means resiliently urging the tubular piston and the valve seat member toward retracted positions, means for retarding the rate of movement of the piston, and valve seat members to retracted positions, said last mentioned means comprising a plunger extending axially from each the piston and valve seat member, and fitting closely within bores in the ends of the housing and a check valve for admitting fluid to the interior of each of said bores as the piston and valve seat member move from retracted positions.

12. A well flowing device comprising a valve body, a housing attached to said body and having an opening in its lower end for communication to the interior of the valve body, a tubular piston slidable in the lower end of said housing, and adapted to conduct pressure fluid from the lower end of the housing to an opening in the valve body, a valve seat member slidably mounted in the housing in opposed alignment with the tubular piston, said valve seat member including a metering pin adapted to enter the bore of the tubular piston and meter the flow of pressure fluid to the interior of the valve body, means resiliently urging the tubular piston and the valve seat member toward retracted positions, and means for releasably holding the piston and valve seat members at their innermost positions and in engagement whereby the passage through the piston is closed.

13. In a well flowing device of the character described, a nipple adapted to be joined into the flow tubing of a well, a shell assembly upon said nipple, a passage for pressure fluid through a portion of said shell assembly, said passage including a chamber proximate the entrance thereto, baffled inlet openings communicating with said chamber, a discharge opening from said passage into said nipple, a restricted longitudinal opening in said passage, said opening having one end communicating with said chamber in said shell assembly, a pressure fluid control valve seat around the opposite end of said restricted longitudinal opening, a piston slidable in said shell, a spring under said piston, said spring normally urging the pressure fluid control valve open and in spaced relation to said pressure fluid valve seat, packing around said piston and means for expanding said packing against a member of said shell assembly, a rod attached to said piston and extending in the direction of said restricted longitudinal opening, a pressure fluid control valve upon said rod, said valve being normally spaced from said seat and adapted to become engaged therewith, a metering pin central of said valve and extending from said rod, said pin being adapted to have diminishing clearance within said longitudinal opening as the valve approaches said seat, a chamber in an axial extension of said piston, said extension being upon the opposite end thereof from said rod, an opening of said shell assembly in which said extension is slidable, one end of said opening being closed, a valve seat in said chamber, a check valve in said chamber, an opening axial of said chamber and valve seat, said opening communicating between said chamber and transverse openings through said axial extension, said transverse openings being proximately above said piston, and openings through said shell assembly above the uppermost position of said piston therein.

14. In a flow device for wells, a valve in a passage, a seat for said valve and gas metering means cooperable with said valve and passage in combination with means for delaying the opening action only of said valve, said last mentioned means comprising a check valve which remains closed as the first mentioned valve moves toward open position and which opens as the first mentioned valve moves toward closed position.

15. In a well flowing device, a valve in a passage for pressure fluid, metering means in relation to said valve, means for preventing said valve from opening suddenly, said means being operable to permit rapid closure of the valve, a cylinder in alignment with said valve, a piston within said cylinder and means for maintaining said piston in gas-tight relation with the walls of said cylinder, said valve being operable by said piston, the same being of greater area than the effective area of said valve and being operated by the difference in pressures obtaining upon opposite ends thereof.

ALEXANDER BOYNTON.